US007024431B1

(12) United States Patent
Kornelson et al.

(10) Patent No.: US 7,024,431 B1
(45) Date of Patent: Apr. 4, 2006

(54) DATA TRANSFORMATION TO MAINTAIN DETAILED USER INFORMATION IN A DATA WAREHOUSE

(75) Inventors: Kevin Paul Kornelson, Redmond, WA (US); Murali Vajjiravel, Sammamish, WA (US); Rajeev Prasad, Kirkland, WA (US); Paul D. Clark, Sammamish, WA (US); Brian Burdick, Bellevue, WA (US); Tarek Najm, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 473 days.

(21) Appl. No.: 10/429,571

(22) Filed: May 5, 2003

Related U.S. Application Data

(63) Continuation-in-part of application No. 09/611,405, filed on Jul. 6, 2000, now Pat. No. 6,721,749.

(51) Int. Cl.
*G06F 17/30* (2006.01)

(52) U.S. Cl. ........................ 707/202; 707/10; 707/100; 709/203

(58) Field of Classification Search ................ 707/2–4, 707/100–206, 10; 709/203
See application file for complete search history.

(56) References Cited

U.S. PATENT DOCUMENTS

| | | | | |
|---|---|---|---|---|
| 5,706,507 | A | 1/1998 | Schloss | 707/104.1 |
| 5,926,818 | A * | 7/1999 | Malloy | 707/100 |
| 6,266,664 | B1 | 7/2001 | Russell-Falla et al. | 707/5 |
| 6,418,450 | B1 | 7/2002 | Daudenarde | 707/200 |
| 6,745,367 | B1 | 6/2004 | Bates et al. | 715/500 |
| 6,871,228 | B1 * | 3/2005 | Shah et al. | 709/224 |
| 2002/0070953 | A1 * | 6/2002 | Barg et al. | 345/700 |
| 2002/0120754 | A1 | 8/2002 | Anderson et al. | 709/229 |

FOREIGN PATENT DOCUMENTS

| | | | |
|---|---|---|---|
| DE | 10024733 | A1 | 11/2001 |
| EP | 1076299 | A2 | 2/2001 |
| WO | WO 00/68833 | A2 | 11/2000 |

OTHER PUBLICATIONS

"Look Ahead Filtering of Internet Content," IBM Technical Disclosure Bulletin, vol. 40, No. 12, Dec. 1, 1997, pp. 143, New York, U.S.A.

Qiu et al., "Using Link Types in Web Page Ranking and Filtering," Web Information Systems Engineering, 2001, Proceedings of the Second International Conference, vol. 1, Dec. 3, 2001, pp. 311-320.

(Continued)

*Primary Examiner*—Jean Homere
*Assistant Examiner*—Cheryl Lewis
(74) *Attorney, Agent, or Firm*—Senniger Powers

(57) ABSTRACT

Transforming data prior to loading the data into a data warehouse. Software of the invention partitions data records received from a plurality of servers and performs sequential file management operations and identifier management operations on each of the partitions prior to loading the data records into the data warehouse. Data records transformed according to the invention are easier to load into the data warehouse and easier to manipulate after loading. The invention enables analysis and data mining of tens of terabytes of user level detail data and summary data.

22 Claims, 8 Drawing Sheets

OTHER PUBLICATIONS

Soumen et al., "Enhanced Hypertext Categorization Using Hyperlinks," Sigmod Record, Jun. 1998, vol. 27, No. 2, pp. 307-318, Croatian Soc. Chem. Eng., Croatia.
Oh et al., A Practical Hypertext Categorization Method Using Links and Incrementally Available Class Information, Jul. 24, 2000, vol. 34, pp. 264-271, U.S.A.
Bonifati et al., "Designing Data Marts for Data Warehouses, " ACM Transactions on Software Engineering and Methodology (TOSEM), Oct. 2001, pp. 452-483, vol. 10, Issue 4, ACM Press, New York, U.S.A.
Gray et al., "Present and Future Directions in Data Warehousing," ACM SIGMIS Database, 1998, pp. 83-90, vol. 29, Issue 3, ACM Press, New York, U.S.A.
Tolkin, "Aggregation Everywhere: Data Reduction and Transformation in the Phoenix Data Warehouse," Proceedings of the Second ACM International Workshop on Data Warehousing and OLAP, 1999, pp. 79-86, ACM Press, New York, U.S.A.
Chen, et al., "Internet Traffic Warehouse," Proceedings of the 2000 ACM SIGMOD International Conference on Management of Data, 2000, pp. 550-558, ACM Press, New York, U.S.A.
Indulska et al., "On Aggregation Issues in Spatial Data Management," Proceedings of the Thirteenth Australasian Conference on Database Technologies, 2002, pp. 75-84, vol. 5, ACM Press, New York, U.S.A.
Kimball et al., The Data Warehouse Lifecycle Toolkit, 1998, pp. 357-366, John Wiley & Sons, Inc., U.S.A.
Welburn, Advanced Structured Cobol, 1983, pp. 90-144, Mayfield Publishing Company, U.S.A.

* cited by examiner

DATA TRANSFORMATION TO MAINTAIN DETAILED USER INFORMATION IN A DATA WAREHOUSE

CROSS-REFERENCE TO RELATED APPLICATION

This is a continuation-in-part of U.S. patent application Ser. No. 09/611,405, U.S. Pat. No. 6,721,749, filed Jul. 6, 2000, which is hereby incorporated herein by reference in its entirety for all purposes.

TECHNICAL FIELD

The present invention relates to the field of data warehousing. In particular, this invention relates to techniques for transforming data gathered from a variety of sources for storage in a data warehouse.

BACKGROUND OF THE INVENTION

A data warehouse is a database designed to support decision-making in an organization. A typical data warehouse is batch updated on a periodic basis and contains an enormous amount of data. For example, large retail organizations may store one hundred gigabytes or more of transaction history in a data warehouse. The data in a data warehouse is typically historical and static and may also contain numerous summaries. It is structured to support a variety of analyses, including elaborate queries on large amounts of data that can require extensive searching.

The data warehouse often represents data as a "cube" of three, four, or more dimensions. For example, a business may be modeled as a cube having three dimensions, corresponding to real-world business distinctions such as Product, Time, and Market. Any point within the cube is at the intersection of the coordinates defined by the edges of the cube, and is viewed as corresponding to a metric or measurement that is valid for the combination of dimension values that define the point. For example, such metrics might include "units sold," "price," etc. Each point may indicate the price and units sold of a particular product, at a particular time or time period, in a given market.

Some systems implement this data model from within a relational database. A relational database has many interrelating tables. As known in the art, each table has a two dimensional structure of values with records and fields. A table can have a combination of one or more fields called the primary key. This means that for each record, the values in the fields of the primary key serve to identify the record. These values in fields of the primary key are known as primary key identifier (PKID). A given PKID should be unique in a table; that is, no two records should have the same PKID.

Tables in a relational database are related by means of foreign keys. A foreign key is a combination of one or more fields. Each foreign key relates to a primary key of another table. A record in a table with a foreign key relates to a record in a table with a primary key if the fields in the foreign key have the same values as the fields in the primary key.

Those skilled in the art are also familiar with dimension tables. A dimension table is a collection of information describing a business construct. For example, in a model designed to represent web usage, there is a "Domain" dimension table including information in the form of strings that describe each target domain, such as the site the domain belongs to and the country code for the domain. Other dimension tables contain information describing concepts such as "Time," "Referring Domain," and many others. Note that dimensions are usually parameters relating to the organization of measured data, and do not indicate the measured data itself.

Other tables include fact tables which contain the actual numeric metrics, such as a count of page views, that a user might be interested in viewing. In addition, there are defined relationships between the dimension and fact tables. Specifically, the fact table has a plurality of foreign keys which relate to primary keys in the dimension tables. This allows the individual records of the fact table to be indexed or matched up to specific dimensional values. That is, given a set of dimensional values, corresponding metrics can be located. In the example above, a user wishes to view data from the page views fact table. The Domain dimension table allows the user to choose a single domain, and then see only the data from the page views fact table that corresponds to that target domain. Similarly, the time dimension allows the user to choose a single day and view only the data from the page views fact table that corresponds to the chosen target domain and the chosen date. Choosing the dimensions across which a user wants data to be summarized is sometimes referred to as slicing the data. A definition of the relationship between tables in a data warehouse is called a schema.

Most metrics are aggregates that summarize data across criteria provided by one or more dimension tables in the data warehouse. In the example above, the count of page views is aggregated across a specific target domain (from the Domain table) and a specific day (from the Time table). This particular metric provides a count of a given value. Other metrics might provide a sum, average, or other summary. Still other metrics are calculated, rather than aggregated. For example, a data warehouse might provide metrics such as Peak Hour Page Views, which provides the hour during which the most page views are received. This metric is not derived by summarizing a value across dimensions; instead, it is calculated by comparing a value across dimensions and selecting the top value. Other calculated metrics might provide the bottom value, the top or bottom N values, the top or bottom percentage, etc.

Those skilled in the art are familiar with data modeling such as this (see Kimball, Ralph, *The Data Warehouse Lifecycle Toolkit*, Wiley 1998).

After the tables of a data warehouse have been populated with actual data, the warehouse becomes very useful. However, the process of populating the data warehouse can become quite difficult because of the enormous amounts of data involved. Consider, as an example, the task of populating a web usage data warehouse in a company that maintains numerous web sites administered by different divisions within the company in different parts of the world. Furthermore, each site may have a number of individual servers. For example, the company may maintain more than five hundred servers, which might use different types of server software. Together, the servers may generate over 1.5 billion log records, each representing a page hit. For data warehousing purposes, it is desired to combine data logged by each of these servers and use it to populate a data warehouse.

Some prior art systems use "Extract, Transform, and Load" (ETL) methodology. Extraction refers to actually obtaining the data from individual data sources such as servers. Unfortunately, this process in itself can be particularly difficult when dealing with the enormous size of the data in a web usage data warehouse or other large database. Transformation indicates processing the data to put it into a more useful form or format. Loading refers to the process of loading the data into the tables of a relational database. These existing systems provide summaries of user information. However, there is a need for retaining user level detail data in addition to the summaries. For example, there is a need to provide monthly views of data that is collected daily. Such collection results in very large amounts of data (e.g., seventy-five terabytes per month). Because the existing systems load all the data in one or more databases across many computing devices, servicing a user query for data requires scanning all sets of data in all the databases. Such systems typically employ massively parallel or symmetric parallel systems with hardware at a cost of several million dollars. There is a need for a system using a single database in which the data is correlated prior to loading into the database.

To effectively analyze and data mine detailed user information for hundreds of millions of users (e.g., tens of terabytes of data), the user information must be kept up-to-date and reduced in volume to something that an online analytical processing (OLAP) server can handle. The high cardinality user detail data may be too large to load into the database directly. There is a need for extracting a huge amount of data from a large number of different servers and transforming the extracted data to populate a single data warehouse. Further, there is a need for cross-referencing (e.g., per user) all the different types of data (e.g., newsletters, member directories, web logs).

For these reasons, a system for collecting and maintaining detailed user information is desired to address one or more of these and other disadvantages.

SUMMARY OF THE INVENTION

The invention transforms data prior to loading the data in a data collection and warehousing system. In particular, the invention performs transformations on log files received from a plurality of data sources to enable loading the data into a data warehouse and manipulating the loaded data. The log files include records and partition key values associated therewith. The invention partitions the received data records based on the partition key value corresponding to the data record and performs sequential file management operations and identifier management operations on each of the partitions prior to loading the data records into the data warehouse.

The invention maintains up-to-date detailed user information for hundreds of millions of users in part by reducing the volume of data to a level that an online analytical processing (OLAP) server can handle in a cost effective manner. The invention enables analysis and data mining of tens of terabytes of information. The invention retains user level detail data and summary data. For example, data collected daily may be viewed per month. The invention is applicable to various embodiments including data mining applications that have high levels of cardinality or detail. In one form, the invention uses relatively inexpensive software and hardware (e.g., $500,000 worth of hardware) compared to the high cost for massively parallel or loosely coupled symmetric systems.

In accordance with one aspect of the invention, a method transforms data in a data collection and warehousing system that receives a plurality of individual log files from a plurality of servers. The log files each include a data record and at least one partition key value corresponding thereto. The method includes partitioning the received data records by assigning each of the data records to one of a plurality of partitions based on the partition key value corresponding to the data record. Each of the partitions has one or more of the partition key values associated therewith. The method also includes generating a fact table for each of the partitions. The fact table includes the partitioned data records and corresponding partition key values.

In accordance with another aspect of the invention, a method transforms data in a data collection and warehousing system. The method includes receiving a plurality of individual log files from a plurality of servers. The log files each include a data record and a partition key value corresponding thereto. The method also includes sorting the received data records according to the corresponding partition key values. The method also includes merging the sorted data records and corresponding partition key values with other data records and other corresponding partition key values. The other data records and other corresponding partition key values have been previously received and sorted. The method also includes mapping each of the partition key values to another key value. The other key value represents a unit of information smaller than the partition key value associated with the merged data records. The method also includes generating a dimension table including the merged data records and mapped key values.

In accordance with yet another aspect of the invention, one or more computer-readable media have computer-executable components for transforming a plurality of individual log files received from a plurality of servers in a data collection and warehousing system. The log files each include a data record and at least one partition key value corresponding thereto. The components include a process management component for partitioning the received data records by assigning each of the data records to one of a plurality of partitions based on the partition key value corresponding to the data record. Each of the partitions has one or more of the partition key values associated therewith. The components also include a data management component for sorting the data records partitioned by the process management component according to the corresponding partition key values and merging the sorted data records and corresponding partition key values with other data records and other corresponding partition key values. The other data records and other corresponding partition key values have been previously received. The data management component further maps each of the partition key values to another key value. The other key value representing a unit of information smaller than the partition key values associated with the merged data records.

In accordance with still another aspect of the invention, a data collection and warehousing system receives a plurality of individual log files from a plurality of servers. The log files each include a data record and at least one partition key value corresponding thereto. The system includes means for partitioning the received data records by assigning each of the data records to one of a plurality of partitions based on the partition key value corresponding to the data record. Each of the partitions has one or more of the partition key values associated therewith. The system also includes means for sorting the partitioned data records according to the corresponding partition key values and merging the sorted data records and corresponding partition key values with other data records and other corresponding partition key values. The other data records and other corresponding partition key values have been previously received. The system also includes means for mapping each of the partition key values to another key value. The other key value represents a unit of information smaller than the partition key values associated with the merged data records.

Alternatively, the invention may comprise various other methods and apparatuses.

Other features will be in part apparent and in part pointed out hereinafter.

BRIEF DESCRIPTION OF THE DRAWINGS

Corresponding reference characters indicate corresponding parts throughout the drawings.

DETAILED DESCRIPTION OF THE INVENTION

Figure 1:
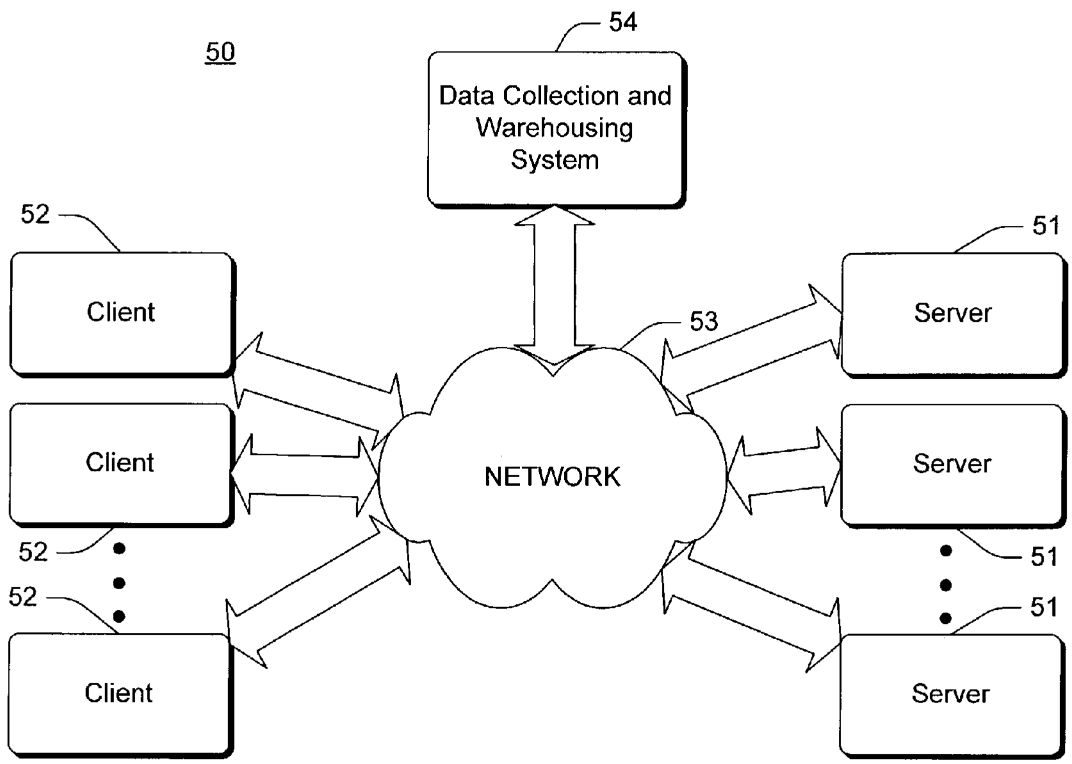
FIG. 1 is an exemplary embodiment of a client/server network system and a data collection and warehousing system.

Referring first to FIG. 1, an exemplary embodiment of the invention includes a client/server network system 50 and a data collection and warehousing system 54. FIG. 1 shows the network system 50 comprising a plurality of servers 51 and clients 52. These computers 51, 52 are connected for high-speed data communications over a network 53, using well-known networking technology. The Internet is one example of network 53. Servers 51 accept requests from large numbers of remote network clients 52. The data servers 51 provide responses comprising data that potentially includes graphically formatted information pages. In many cases, the data is in the form of hypertext markup language (HTML) documents. In addition to the servers 51 and clients 52, the system of FIG. 1 includes a central collection facility or data warehousing system 54. The data warehousing system 54 communicates through network 53 with other network nodes such as servers 51 and clients 52, although other means of communication may also be utilized. The data warehousing system 54 is described in more detail below.

Figure 2:
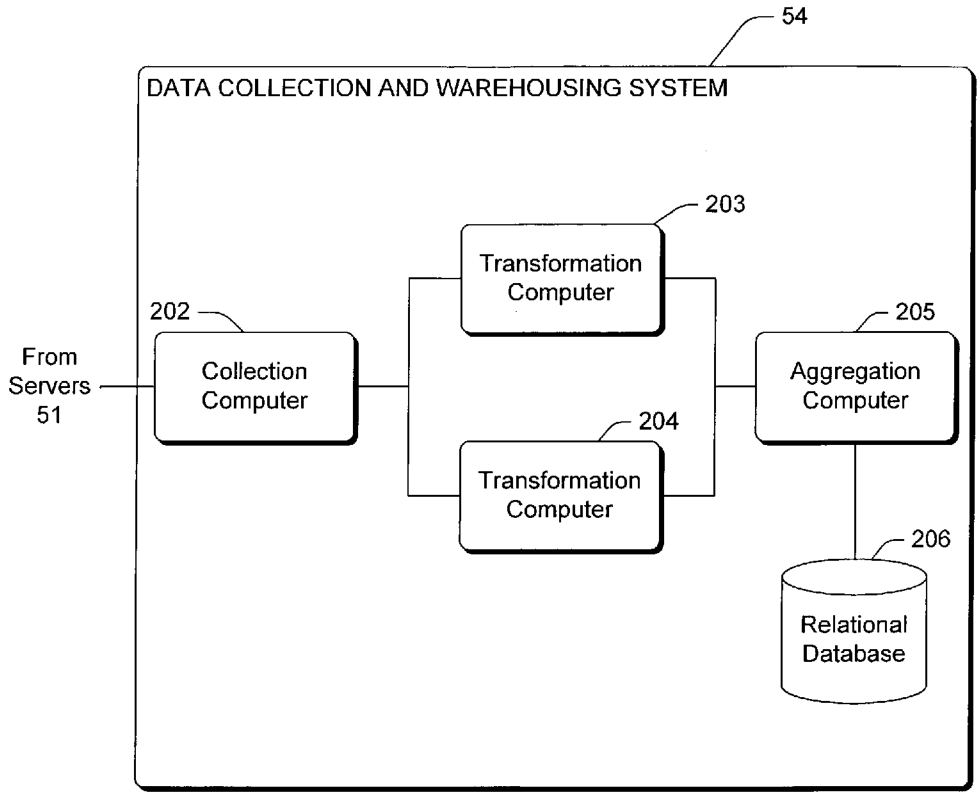
FIG. 2 is a block diagram illustrating an exemplary implementation of a data collection and warehousing system such as the one shown in FIG. 1.

Referring next to FIG. 2, a block diagram illustrates an exemplary implementation of the data collection and warehousing system 54 shown in FIG. 1. FIG. 2 shows elements of data collection and warehousing system 54 that is connected for data communications with servers such as network servers 51 (see FIG. 1). Although only a relatively few servers are shown for convenience, it should be recognized that the invention is intended for use with any number of such servers and corresponding log entries. In one embodiment, the invention has been designed for use with over five hundred Internet servers located in different parts of the world. Collectively, these servers may generate an enormous number of log entries (e.g., over 1.5 billion) that are processed by the system 54 shown in FIG. 2.

The data warehousing system includes a data collection computer 202, one or more transformation computers such as transformation computers 203, 204, an aggregation computer 205, and a database repository or server such as a relational database 206. Different processing tasks are distributed to the illustrated computers as described below. However, other hardware configurations and other divisions of processing tasks are within the scope of the invention. In some embodiments, a single computer may perform the processes implemented by data collection computer 202, transformation computers 203, 204, and aggregation computer 205. The computers shown in FIG. 2 communicate with each other and with servers 51 through conventional communications channels, including the Internet, local area networks, and/or wide area networks.

It is contemplated by the inventors that the invention is operable with any form of database repository (e.g., relational or non-relational). However, in one embodiment, the database repository includes relational database 206 as a structured query language (SQL) database which comprises the data warehouse. The tables of the database are related to each other under a schema designed to efficiently represent the targeted data and to allow a user to slice the data for viewing desired statistics. In one embodiment, the database is modeled dimensionally using a snowflake schema wherein a central fact table contains a plurality of foreign keys and metrics. The foreign keys allow the metrics to be sliced in various different ways. Specifically, the foreign keys relate the fact table to surrounding dimensions or dimension tables that contain definitions of the various dimensions by which the metrics can be organized or sliced: time, domain, target page, etc. The database contains a plurality of fact tables and associated dimension tables. Furthermore, other types of schemas, such as star schemas, may also be used.

The components of FIG. 2 implement a method of populating relational database 206 with logged data from a plurality of servers such as servers 51. The components form a processing pipeline that receives individual log files from the plurality of servers, on a periodic basis, and passes the received files through a sequence of operations. The operations include, but are not limited to, the exemplary operations next described.

System 54 periodically provides a pre-processor component to each of the servers. Each server executes the pre-processor component to pre-process that server's data. Each server compresses the pre-processed log data and sends it to collection computer 202. The data sources may include user information such as web logs, instant messaging logs, newsletter usage statistics, member directory information (e.g., hobbies), and mobile usage statistics. Collection computer 202 decompresses the pre-processed data and provides it to one or more transformation computers such as transformation computers 203, 204. For each pre-processed log file, the transformation computers 203, 204 parse the data to generate (a) a fact file containing one or more foreign key values and metrics for eventual use in the data warehouse (e.g., relational database 206), and (b) a dimension file containing one or more primary key values and strings for eventual use in the data warehouse. In one example, each of the key values is a primary key identifier (PKID) for eventual storage and use by the data warehouse. During this parsing, the transformation computers 203, 204 scrub the fact files and dimension files and apply transformation logic to the scrubbed fact files and dimension files.

The fact files are provided to aggregation computer 205, which further parses the files to generate, for each fact file, a plurality of fact tables corresponding to different fact tables of the data warehouse. Each fact table contains one or more foreign key values and associated metrics corresponding to primary key identifiers (IDs) in the data warehouse. The dimension files are also provided to aggregation computer 205, which further parses the files to generate, for each dimension file, a plurality of dimension tables corresponding to different dimension tables of the data warehouse. Each dimension table contains one or more primary key values and dimension strings corresponding to primary key IDs in the data warehouse.

The aggregation computer 205 merges tables corresponding to the same data warehouse table to generate fact and dimension tables that each correspond to a single one of the data warehouse tables. The aggregation computer 205 then loads these fact and dimension tables directly into the corresponding data warehouse tables of the database repository 206. Little or no further processing is required within the relational database 206 structure of the data warehouse.

This exemplary pipeline provides a capacity and flexibility that has previously been unattainable without significantly greater investments in computer processing power.

Figure 3:
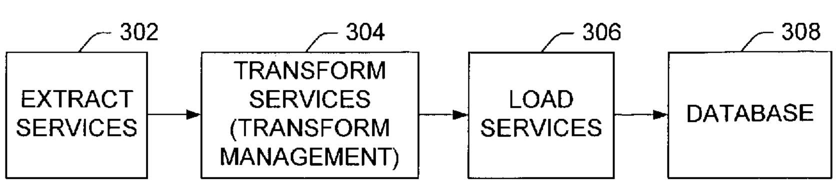
FIG. 3 is an exemplary block diagram illustrating an extract/transform/load (ETL) methodology for populating a data warehouse.

Referring next to FIG. 3, an exemplary block diagram illustrates a template for extract/transform/load (ETL) services for a large-scale data warehouse. Extract services 302 are executed on servers such as server 51 or elsewhere (e.g., on the host servers that serve web bugs) to collect user data. A transformation computer such as transformation computer 203 or 204 provides transform management services 304 to apply transformation logic to the collected data. Load services 306 aggregate the transformed data (e.g., via aggregation computer 205) and load the aggregated data into a database 308 (e.g., database repository 206).

Figure 4:
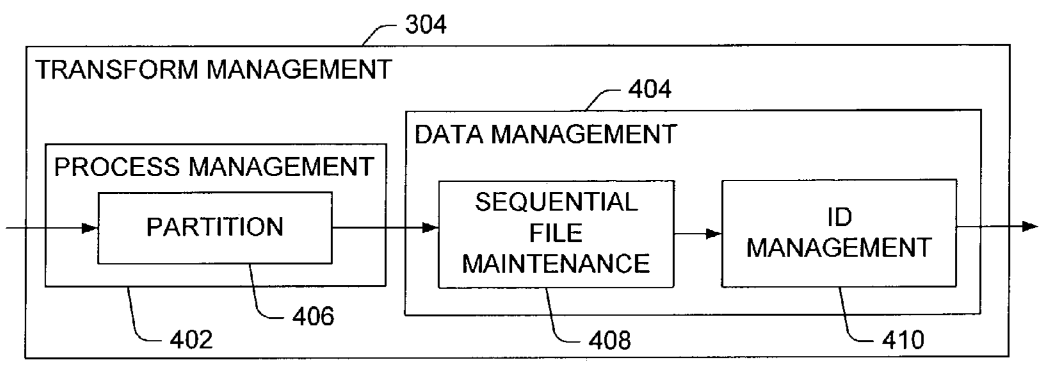
FIG. 4 is an exemplary block diagram illustrating a transform management component in the ETL methodology of FIG. 3.

Referring next to FIG. 4, an exemplary block diagram illustrates transform management component 304 in the ETL methodology of FIG. 3. The exemplary transform management component 304 includes a process management module 402 and a data management module 404. The process management module or component 402 includes a partition component 406 that partitions data records by assigning each of the data records to one of a plurality of partitions based on the value of a partition key field corresponding to the data record. Each of the partitions has one or more of the partition key values associated therewith and, in one embodiment, all the input data records having a specific partition key value are stored within the same partition. The process management component 406 generates a non-relational fact table for each of the partitions. The generated fact table stores the partitioned data records and corresponding partition key values. The generated fact table corresponds to a relational fact table in the data warehouse.

The data management module 404 includes a sequential file maintenance (SFM) module 408 and an identifier (ID) management module 410. The SFM module 408 of the data management component 404 sorts, according to the corresponding partition key values, the data records partitioned by the process management component 402. The SFM module 408 further merges the sorted data records and corresponding partition key values (e.g., incremental data) with other data records and other corresponding partition key values (e.g., historical data). The historical data represents data records and corresponding partition key values that have previously been received and correlated. The ID management module 410 of the data management component 404 maps each of the partition key values to another key value representing a unit of information smaller than the partition key values associated with the merged data records.

The data management component 404 generates a non-relational dimension table corresponding to a relational dimension table in the data collection and warehousing system. The generated dimension table contains the merged data records and mapped partition key values. The data management component 404 loads the dimension table into a relational database in the data collection and warehousing system. Alternatively, a load service receives the dimension table from the data management component 404 and loads the dimension table into the data warehouse. In one form, the process management component 402 and the data management component 404 include one or more non-relational database application programs. That is, the components 402, 404 include application programs other than relational database application programs.

In one embodiment, the components illustrated in FIG. 4 include computer-executable components stored on one or more computer-readable media. Each of the modules described in FIG. 4 are described in detail with reference to FIG. 5, FIG. 7, and FIG. 8.

Partitioning (Process Management Services)

Figure 5:
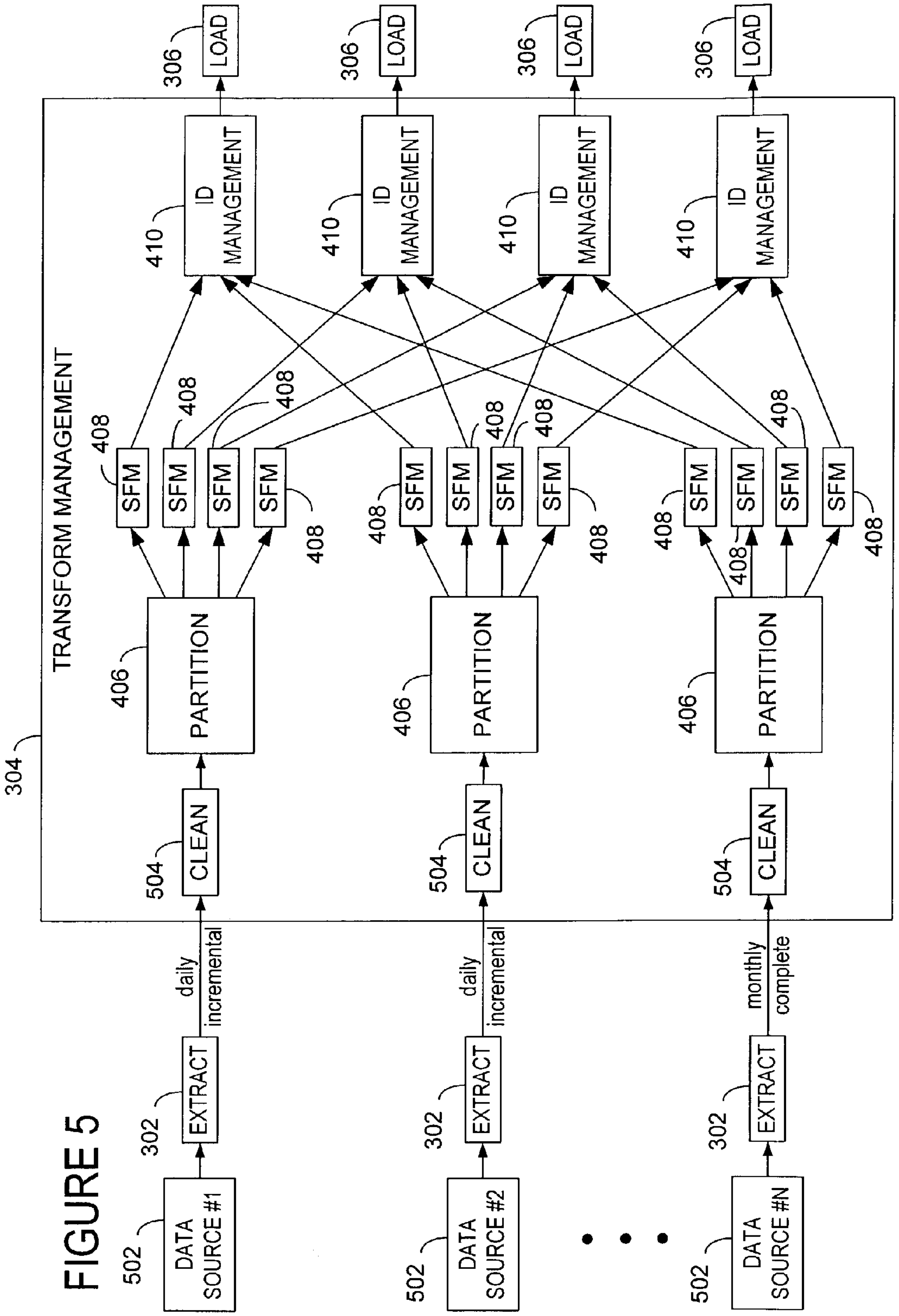
FIG. 5 is an exemplary block diagram illustrating detailed view of the transform management component of FIG. 4.

Referring next to FIG. 5, an exemplary block diagram illustrates a detailed view of the transform management component 304 of FIG. 4. Extract modules 302 such as those executing on server 51 collect and extract data from a variety of data sources 502 such as data source #1 through data source #N. In the example of FIG. 5, the data from data source #1 and data source #2 is incremental in that it is collected during a time interval (e.g., daily) smaller than the time interval (e.g., monthly) over which a report or summary is generated. Data source #N represents complete data in that the collected data corresponds to an entire month. Generally, the data records correspond to a metric representing a measurement of interest to a user.

The transform management component 304 includes partition modules 406, SFM modules 408, and ID management modules 410 in addition to one or more cleansing modules 504. The cleansing modules 504 execute to perform data scrubbing on the input data records. Data scrubbing describes a process of making data more accurate, concise, and consistent. In one form, data scrubbing includes operations to ensure consistent descriptions, punctuation, syntax and other content issues, and also to substitute selected data with more concise representations of the data. For simplicity, only one set of cleansing modules 504 is illustrated in FIG. 5. However, it is contemplated by the inventors that a transform management module 304 with additional or fewer cleansing modules 504 in locations other than those illustrated in FIG. 5 is within the scope of the invention.

The partition module 406 divides the input data into partitions. According to the invention, additional data transformation operations are then applied to each of the partitions in parallel. In particular, data transformations, computations, and aggregations are applied to one partition without need to refer to data in any of the other partitions. As such, there is no need for data synchronization between the partitions. Partitioning provides scalability in that the resources of any number of processing units and computers may be used efficiently. The parallel aspect to the partitions continues through to the load process.

While FIG. 5 illustrates four partitions for each data source for simplicity, it is contemplated by the inventors that the invention is operable with any number of partitions. For example, the data may be divided into sixty-four (64) partitions per data source. The optimum partitioning may be based on hardware. For example, with a 32-bit processor, there are 2ˆ32 addresses available (four gigabytes) with two gigabytes for user processes and two gigabytes for operating system overhead. As such, sixty-four partitions operate within the available address space to provide partitioning according to the invention. For a 64-bit processor, partitioning may not be needed. Alternatively, partitioning may be desired for multi-processor machines. In one embodiment, each of the partitions corresponds to a processor in a multi-processor computer system.

Partitioning is performed on fact tables storing input data records. The invention includes partitioning the input data records by assigning each of the data records to one of a plurality of partitions based on the partition key value corresponding to the data record. Each of the partitions has one or more of the partition key values associated therewith or assigned thereto. For example, the partition key values may include an identifier such as a user identifier based on cookies, a user identifier based on an e-mail address, a user identifier based on logon information, a machine identifier, a time interval, a region, and/or a data source (e.g., a specific advertisement). Further, the partition key values may include a primary key for eventual storage and use by the data collection and warehousing system. All data for each partition key value is in one partition. Each partition may have data associated with one or more partition keys. For example, data may be partitioned according to a subset of the bits in a user identifier (e.g., the upper byte or the lower byte) such that the data is evenly partitioned. In one example, each partition stores data relating to about five million users.

The output of the partitioning process is a non-relational fact table for each of the partitions storing the data records and corresponding partition key values associated with the partition as facts. The non-relational fact table corresponds to a relational fact table of the data collection and warehousing system. The fact table contains the partitioned data records and corresponding partition key values. Partitioning may be performed with one or more application programs other than relational database application programs. Further, the data records assigned to one of the partitions may be re-partitioned to further distribute the data.

After additional transformations (described below), the partitioned data records from the log files are loaded into a relational database such as relational database 206 in the data collection and warehousing system as a function of the fact table.

The data in each of the partitions is further transformed by an SFM module 408 associated with that partition. In the example of FIG. 5 in which three data streams are divided into four partitions, there are twelve SFM modules 408 total. The operation of the SFM module 408 is described in greater detail with reference to FIG. 7. The data output from each SFM module 408 is sent to the ID management module 410. There is one ID management module 410 for each partition. In the example of FIG. 5 with four partitions, there are four ID management modules 410. In particular, a first ID management module accepts data for a first partition in each of the three data streams, a second ID management module accepts data for a second partition in each of the three data streams, etc. The operation of the ID management module 410 is described in greater detail with reference to FIG. 8. The data output from each ID management module 410 is sent to the load module 306 for populating the data warehouse.

One or more computer readable media have computer-executable instructions for implementing the data flow illustrated in FIG. 5.

Figure 6:
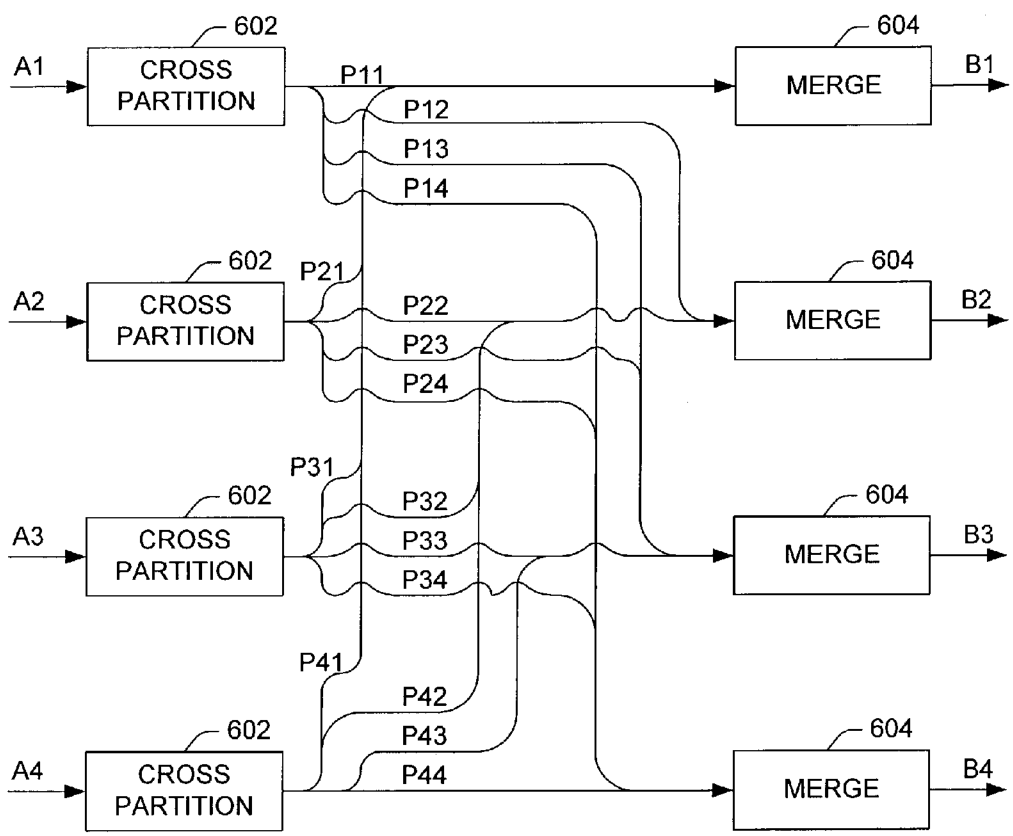
FIG. 6 is an exemplary block diagram illustrating cross partitioning of data in the transform management component.

Referring next to FIG. 6, an exemplary block diagram illustrates cross partitioning of data in the transform management component. Cross partitioning data records includes repartitioning the received data records by assigning each of the data records to one of the partitions based on a different partition key value associated with said data record to enable access to the data record via the different partition key value. For example, the first partition key value (key A) corresponds to a user identifier based on logon information, and the different partition key value corresponds to a user identifier based on an e-mail address (key B). Then, the invention software merges the records from each partition of key A to produce a single file per partition of key B. In an example with four partitions, there would be four source files A1, A2, A3, and A4. Each source file would be cross-partitioned by a cross partitioning module 602. Partitioning file A1 yields partitions P11, P12, P13, and P14. Partitioning file A2 yields partitions P21, P22, P23, and P24. Partitioning file A3 yields partitions P31, P32, P33, and P34. Partitioning file A4 yields partitions P41, P42, P43, and P44. A merge module 604 then merges the partitions. Partitions P111, P21, P31, and P41 are merged to produce a result file B1. Partitions P12, P22, P32, and P42 are merged to produce a result file B2. Partitions P13, P23, P33, and P43 are merged to produce a result file B3. Partitions P14, P24, P34, and P44 are merged to produce a result file B4. The result files B1, B2, B3, and B4 may then processed further in accordance with additional transformations in the ETL pipeline (e.g., perform sequential file maintenance, perform ID management operations, or load the result files into the data warehouse).

Sequential File Maintenance

Figure 7:
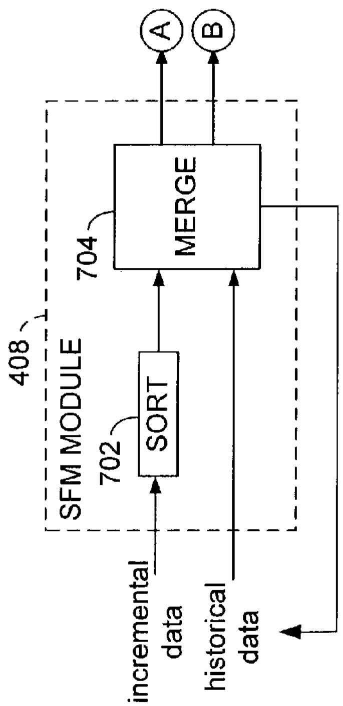
FIG. 7 is an exemplary block diagram illustrating the data flow in the sequential file maintenance module of FIG. 5.

Referring next to FIG. 7, an exemplary block diagram illustrates the data flow in the exemplary SFM module 408 of FIG. 5. In one embodiment, the SFM module 408 is a variant of a sequential file maintenance program (see Welbum, Tyler, Advanced Structured Cobol, Mayfield 1983). While the SFM program in the Welbum reference requires customized software code to implement its functions, the invention is operable with a commercial off-the-shelf (COTS) sorting program. This minimizes the amount of customized software code needed by the SFM module 408. Further, even though the SFM program in the Welbum reference is applicable to OLAP systems, the Welbum reference fails to apply the SFM program to OLAP systems, restricting the applicability of the SFM program to only batch transaction processing systems.

The SFM module 408 of the invention allows the maintenance of user detail information without requiring specialized software or databases. When combined with partitioning as described with reference to FIG. 5, the invention maintains user detail information for hundreds of millions of users with daily updates.

The incremental output from the partitioning process (i.e., facts) is input to the sort process of the SFM module 408. Each SFM module 408 receives the incremental data as a fact table associated with one of the partitions. The SFM module 408 includes a sort component 702 that sorts the received data records according to the partition key values corresponding to the data records. The SFM module 408 also includes a merge module 704 that merges the sorted data with historical data (e.g., merge today's data with yesterday's data). That is, the SFM module 408 merges the sorted data records and corresponding partition key values with other data records and other corresponding partition key values representing stored, previously transformed data. The historical data is stored as facts in one or more flat files accessible to the SFM module 408. The historical data may also be referred to as an input master file. The SFM module 408 replaces the historical data with the merged data. The SFM module 408 generates a fact table storing the merged data records and corresponding partition key values for use by the ID management module.

If the data received by the SFM module 408 is non-incremental (e.g., the monthly data from data source #N), the SFM module 408 passes the data through to the ID management module 410 without updating the historical data because there is no need to aggregate data. That is, there is no need to update historical information if the user wishes to view data correlated per month and the extracted data represents data that has been collected monthly.

ID Management

Figure 8:
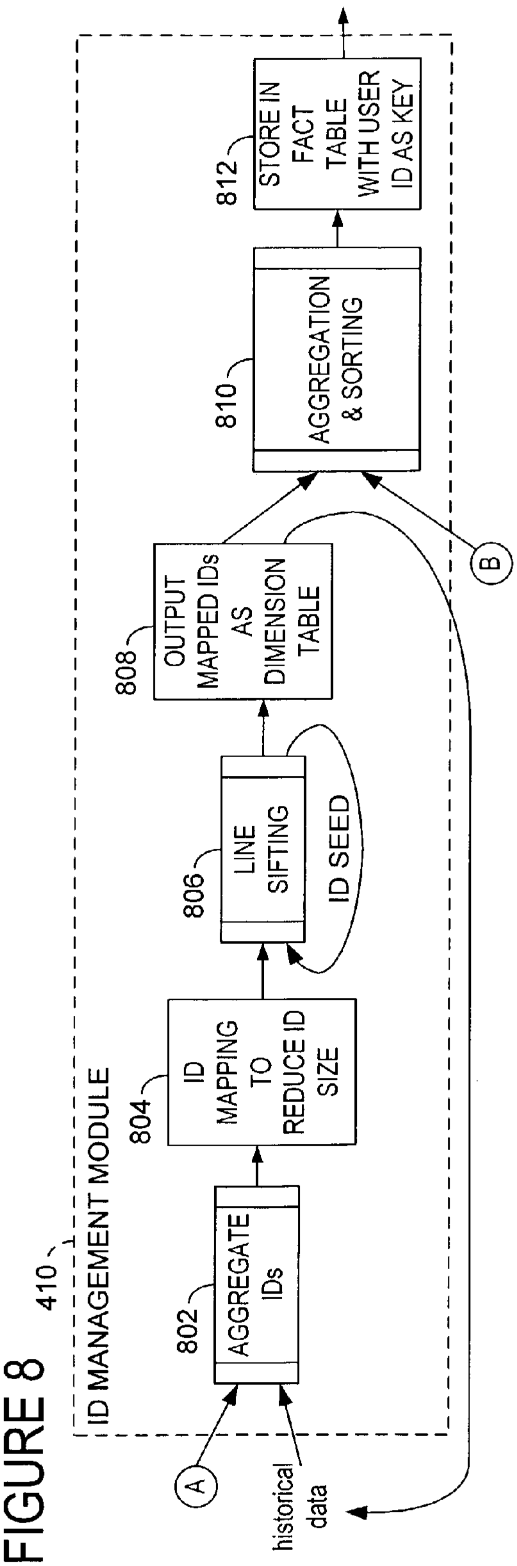
FIG. 8 is an exemplary block diagram illustrating the data flow in the identifier management module of FIG. 5.

Referring next to FIG. 8, an exemplary block diagram illustrates the data flow in the ID management module 410 of FIG. 5. The ID management module 410 maps large identifiers to smaller identifiers. That is, each mapped identifier represents a unit of information smaller than the original identifier associated therewith. The ID management module 410 converts fact tables into dimension tables as it maps large identifiers to smaller identifiers. The ID management module 410 makes it easier for the data warehouse to manage the data (e.g., store and index).

The SFM module 408 and ID management module 410 together allow the transform services to operate without a database connection. Without a database connection, the speed of the data flow through the entire pipeline of FIG. 3 is increased and the number of points of potential failure for the pipeline is reduced.

In one form, ID management is centralized to three functions. First, an aggregation function collects large identifiers from all sources. It is contemplated by the inventors that the invention is operable with any method of aggregation known to those of ordinary skill in the art. Second, a line-by-line processing function assigns new, smaller identifiers. Third, a lookup function reflects the smaller identifiers in files to load to the database. The centralized nature of these functions allows for easy expansion of these functions to other sources.

The ID management module 410 maps each of the partition key values merged by the SFM module 408 to another key value representing a unit of information smaller than the partition key value associated with the data records merged by the SFM module 408. In one form, the ID management module 410 maps the partition key values by aggregating the merged data records and historical data into an aggregated fact table at 802 and assigning a mapped key value to each of the key values in the aggregated fact table at 804. For example, an eight-byte ID may be mapped to a four-byte ID. Line sifting at 806 parses each identifier to complete the mapping and uses an ID seed value when assigning new, smaller identifiers. Even though a mapped ID initially equals zero for a new user, line sifting assigns the incremented ID seed value as the mapped ID. The ID seed value increments each time a new ID is assigned.

The ID management module 410 generates a dimension table at 808 including the merged data records and mapped key values. Generating a dimension table includes creating a non-relational dimension table corresponding to a relational dimension table in the data collection and warehousing system. The created dimension table contains the merged data records and mapped key values from the aggregated fact table. The dimension table is used to update the historical data. Additional aggregation and sorting at 810 on the dimension table and the merged data records from the SFM module 408 produce facts for storage in a fact table using the IDs as mapped key values at 812. The ID management module 410 or a load service loads the data records from the log files into a relational database in the data collection and warehousing system as a function of the generated dimension table. In one embodiment, the functionality of the SFM module 408 and the ID management module 410 (e.g., sorting, merging, mapping, and generating) are performed with one or more application programs other than a relational database application programs.

One or more computer readable media have computer-executable instructions for implementing the data flow illustrated in FIG. 7 and FIG. 8.

Exemplary Operating Environment

Figure 9:
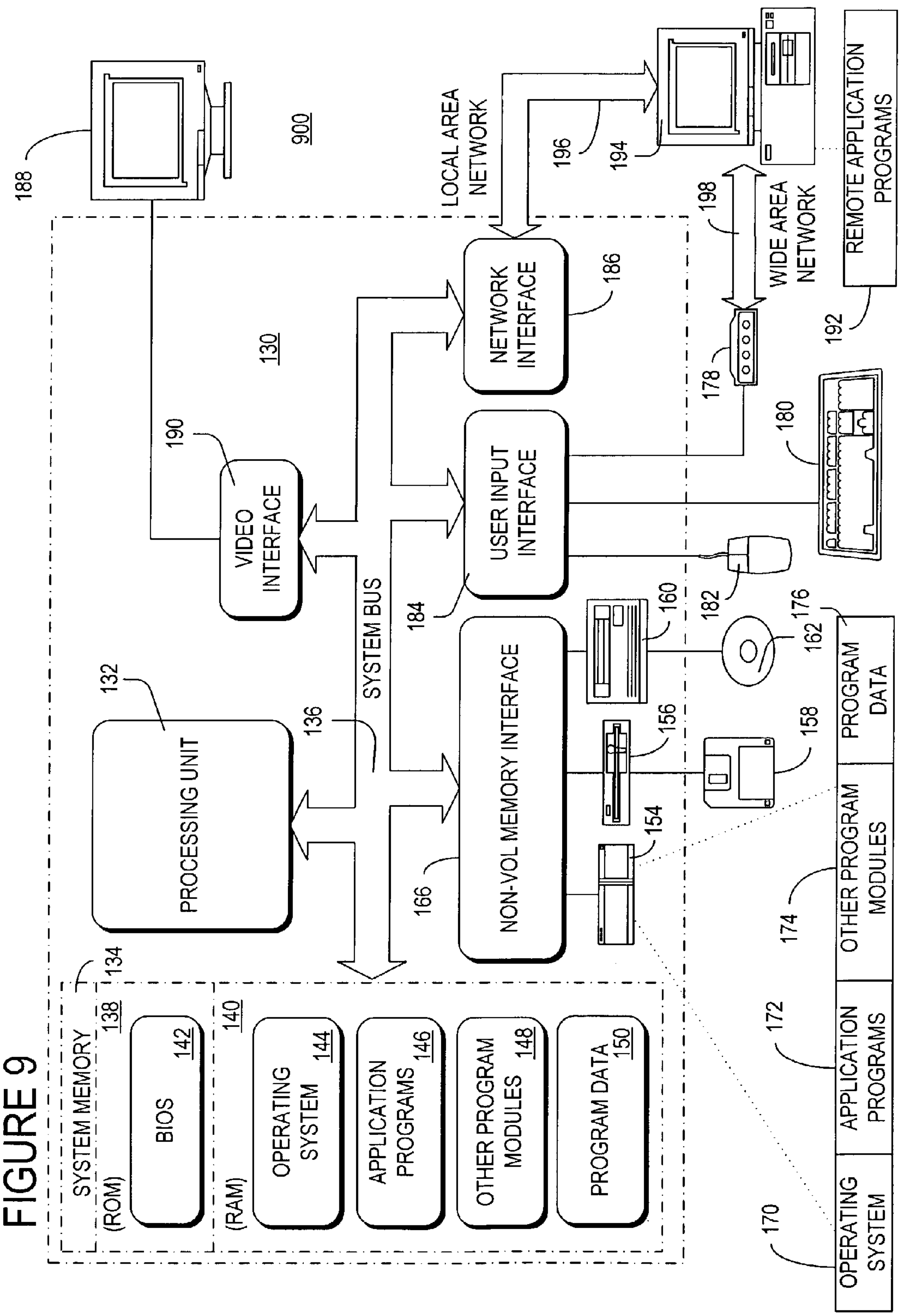
FIG. 9 is a block diagram illustrating one example of a suitable computing system environment in which the invention may be implemented.

FIG. 9 shows one example of a general purpose computing device in the form of a computer 130. In one embodiment of the invention, a computer such as the computer 130 is suitable for use in the other figures illustrated and described herein. Computer 130 has one or more processors or processing units 132 and a system memory 134. In the illustrated embodiment, a system bus 136 couples various system components including the system memory 134 to the processors 132. The bus 136 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 130 typically has at least some form of computer readable media. Computer readable media, which include both volatile and nonvolatile media, removable and non-removable media, may be any available medium that can be accessed by computer 130. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. For example, computer storage media include RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that can be used to store the desired information and that can be accessed by computer 130. Communication media typically embody computer readable instructions, data structures, program modules, or other data in a modulated data signal such as a carrier wave or other transport mechanism and include any information delivery media.

Those skilled in the art are familiar with the modulated data signal, which has one or more of its characteristics set or changed in such a manner as to encode information in the signal. Wired media, such as a wired network or direct-wired connection, and wireless media, such as acoustic, RF, infrared, and other wireless media, are examples of communication media. Combinations of the any of the above are also included within the scope of computer readable media.

The system memory 134 includes computer storage media in the form of removable and/or non-removable, volatile and/or nonvolatile memory. In the illustrated embodiment, system memory 134 includes read only memory (ROM) 138 and random access memory (RAM) 140. A basic input/output system 142 (BIOS), containing the basic routines that help to transfer information between elements within computer 130, such as during start-up, is typically stored in ROM 138. RAM 140 typically contains data and/or program modules that are immediately accessible to and/or presently being operated on by processing unit 132. By way of example, and not limitation, FIG. 9 illustrates operating system 144, application programs 146, other program modules 148, and program data 150.

The computer 130 may also include other removable/non-removable, volatile/nonvolatile computer storage media. For example, FIG. 9 illustrates a hard disk drive 154 that reads from or writes to non-removable, nonvolatile magnetic media. FIG. 9 also shows a magnetic disk drive 156 that reads from or writes to a removable, nonvolatile magnetic disk 158, and an optical disk drive 160 that reads from or writes to a removable, nonvolatile optical disk 162 such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 154, and magnetic disk drive 156 and optical disk drive 160 are typically connected to the system bus 136 by a non-volatile memory interface, such as interface 166.

The drives or other mass storage devices and their associated computer storage media discussed above and illustrated in FIG. 9, provide storage of computer readable instructions, data structures, program modules and other data for the computer 130. In FIG. 9, for example, hard disk drive 154 is illustrated as storing operating system 170, application programs 172, other program modules 174, and program data 176. Note that these components can either be the same as or different from operating system 144, application programs 146, other program modules 148, and program data 150. Operating system 170, application programs 172, other program modules 174, and program data 176 are given different numbers here to illustrate that, at a minimum, they are different copies.

A user may enter commands and information into computer 130 through input devices or user interface selection devices such as a keyboard 180 and a pointing device 182 (e.g., a mouse, trackball, pen, or touch pad). Other input devices (not shown) may include a microphone, joystick, game pad, satellite dish, scanner, or the like. These and other input devices are connected to processing unit 132 through a user input interface 184 that is coupled to system bus 136, but may be connected by other interface and bus structures, such as a parallel port, game port, or a Universal Serial Bus (USB). A monitor 188 or other type of display device is also connected to system bus 136 via an interface, such as a video interface 190. In addition to the monitor 188, computers often include other peripheral output devices (not shown) such as a printer and speakers, which may be connected through an output peripheral interface (not shown).

The computer 130 may operate in a networked environment using logical connections to one or more remote computers, such as a remote computer 194. The remote computer 194 may be a personal computer, a server, a router, a network PC, a peer device or other common network node, and typically includes many or all of the elements described above relative to computer 130. The logical connections depicted in FIG. 9 include a local area network (LAN) 196 and a wide area network (WAN) 198, but may also include other networks. Such networking environments are commonplace in offices, enterprise-wide computer networks, intranets, and global computer networks (e.g., the Internet).

When used in a local area networking environment, computer 130 is connected to the LAN 196 through a network interface or adapter 186. When used in a wide area networking environment, computer 130 typically includes a modem 178 or other means for establishing communications over the WAN 198, such as the Internet. The modem 178, which may be internal or external, is connected to system bus 136 via the user input interface 184, or other appropriate mechanism. In a networked environment, program modules depicted relative to computer 130, or portions thereof, may be stored in a remote memory storage device (not shown). By way of example, and not limitation, FIG. 9 illustrates remote application programs 192 as residing on the memory device. It will be appreciated that the network connections shown are exemplary and other means of establishing a communications link between the computers may be used.

Generally, the data processors of computer 130 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. The invention described herein includes these and other various types of computer-readable storage media when such media contain instructions or programs for implementing the steps described below in conjunction with a microprocessor or other data processor. The invention also includes the computer itself when programmed according to the methods and techniques described herein.

For purposes of illustration, programs and other executable program components, such as the operating system, are illustrated herein as discrete blocks. It is recognized, however, that such programs and components reside at various times in different storage components of the computer, and are executed by the data processor(s) of the computer.

Although described in connection with an exemplary computing system environment, including computer 130, the invention is operational with numerous other general purpose or special purpose computing system environments or configurations. The computing system environment is not intended to suggest any limitation as to the scope of use or functionality of the invention. Moreover, the computing system environment should not be interpreted as having any dependency or requirement relating to any one or combination of components illustrated in the exemplary operating environment. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, executed by one or more computers or other devices. Generally, program modules include, but are not limited to, routines, programs, objects, components, and data structures that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

Exemplary Implementation

In one form, the invention is implemented on a computing device with one or more processors that are the target of a C compiler, with two hundred megabytes of addressable RAM and are capable of either single instruction single data or multiple instruction multiple data stream processing. Further, the invention may be implemented with an operating system that creates and uses files that are approximately sixteen gigabytes in size, manipulates files with filenames that are one hundred characters long, has file paths are that 250 characters long, and supports threads. It is contemplated by the inventors that other implementations having more or less processor functionality and operating system functionality are within the scope of the invention.

Exemplary tools used in the implementation of the invention include a line transformation tool, a line sifting tool, an aggregation tool, and a sorting tool. The line transformation tool provides record-by-record parsing and transformation. In particular, the line transformation tool provides fast parsing capabilities (e.g., greater than ten thousand records/second) and configurable transformations including lookup, if-then-else, string concatenation, string extraction, and error generation.

The line sifting tool provides record-by-record parsing and transformation, including processing values produced by previous records. In particular, the line sifting tool provides fast parsing capabilities (e.g., greater than ten thousand records/second) and configurable transformations including lookup, if-then-else, string concatenation, string extraction, and error generation. In addition, the line sifting tool has the ability to carry values from one record to the next.

The aggregation tool provides aggregation capabilities with fast performance (greater than five thousand records/second) using 75% of memory available to a process. In addition, the aggregation tool provides functions equivalent to the structured query language (SQL) functions of SUM, MIN, MAX, and GROUP BY.

The sorting tool provides sorting, merging, and summarizing capabilities using 75% of memory available to a process. In particular, the sorting tool provides fast performance (e.g., greater than five thousand records/second), sorting and merging functions, and transformations on input data including if-then-else, source selection, and comparison transformations.

An ETL toolset, one or more non-relational database application programs, and the examples described herein (including the figures) constitute means for partitioning the received data records, means for sorting the partitioned data records according to the corresponding partition key values, means for mapping the partition key values to smaller key values (e.g., means for aggregating the merged data records into an aggregated fact table and assigning a mapped key value to each of the partition key values in the aggregated fact table), means for generating a non-relational dimension table corresponding to a dimension table in the data warehouse, and means for loading the data records from the log files into a relational database as a function of the generated dimension table.

Figure 10:
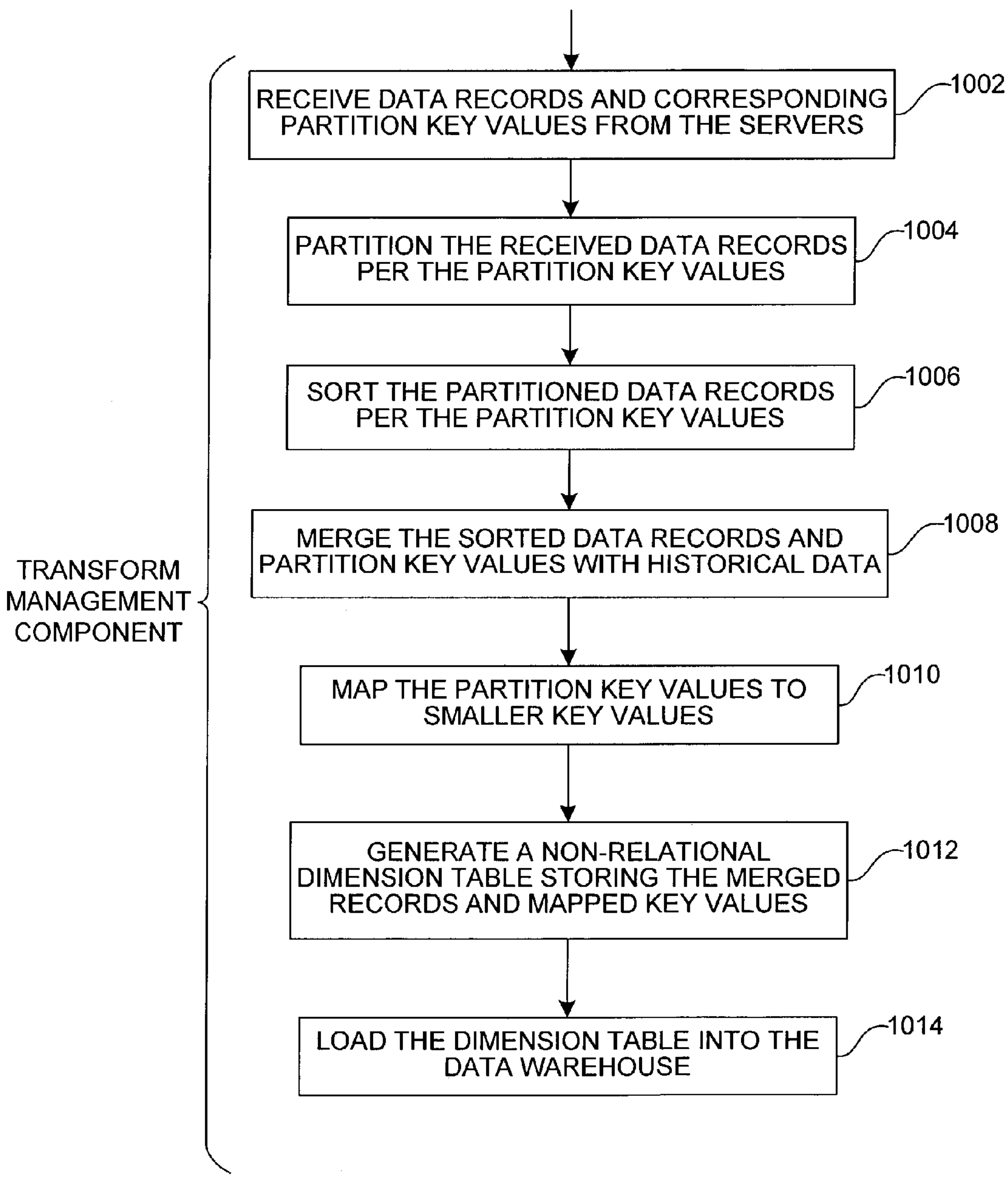
FIG. 10 is an exemplary flow chart illustrating operation of the transform management software according to the invention.

Referring next to FIG. 10, an exemplary flow chart illustrates operation of the transform management software according to the invention. In operation, computer 130 executes computer-executable instructions such as those illustrated in FIG. 10 to implement transformation services that transform data prior to loading the data into a data warehouse. In response to receiving data records and corresponding partition key values from the servers at 1002, computer 130 executes computer-executable instructions to partition the received data records according to the partition key values at 1004, sort the partitions per the partition key values at 1006, and merge the sorted data records with historical data at 1008. The computer-executable instructions, when executed by computer 130, perform identifier management operations by mapping partition key values from the merged records to smaller key values at 1010. The computer-executable instructions also operate to generate a non-relational dimension table storing the merged records and mapped key values at 1012 for loading into a relational database in the data warehouse at 1014.

When introducing elements of the present invention or the embodiment(s) thereof, the articles "a," "an," "the," and "said" are intended to mean that there are one or more of the elements. The terms "comprising," "including," and "having" are intended to be inclusive and mean that there may be additional elements other than the listed elements.

In view of the above, it will be seen that the several objects of the invention are achieved and other advantageous results attained.

As various changes could be made in the above constructions, products, and methods without departing from the scope of the invention, it is intended that all matter contained in the above description and shown in the accompanying drawings shall be interpreted as illustrative and not in a limiting sense.

What is claimed is:

1. A method of transforming data in a data collection and warehousing system comprising:

receiving a plurality of individual log files from a plurality of servers, said log files each comprising a data record and at least one partition key value corresponding thereto;

partitioning the received data records by assigning each of the data records to one of a plurality of partitions based on the partition key value corresponding to the data record, each of the partitions having one or more of the partition key values associated therewith; and generating a fact table for each of the partitions, said fact table comprising the partitioned data records and corresponding partition key values, wherein the partition key values comprise one or more of the following: a user identifier, a machine identifier, a time interval a region, and a data source.

2. The method of claim 1, further comprising loading the partitioned data records from the log files into a relational database in the data collection and warehousing system as a function of the generated fact table.

3. The method of claim 1, further comprising assigning each of the received partition key values to one of the partitions.

4. The method of claim 1, wherein each of the partitions corresponds to a processor in a multi-processor computer system.

5. The method of claim 1, further comprising re-partitioning the data records assigned to one of the partitions.

6. The method of claim 1, further comprising partitioning the received data records by assigning each of the data records to one of the partitions based on a different key value associated with said data record to enable access to said data record via the different key value.

7. The method of claim 1, wherein partitioning and generating are performed with one or more non-relational database application programs.

8. The method of claim 1, wherein generating the fact table comprises creating a non-relational fact table corresponding to a relational fact table of the data collection and warehousing system, said created fact table containing the partitioned data records and corresponding partition key values.

9. The method of claim 1, wherein each of the partition key values comprises a primary key for eventual storage by the data collection and warehousing system.

10. The method of claim 9, wherein each of the data records corresponds to a metric representing a measurement of interest to a user.

11. The method of claim 1, further comprising:

sorting the partitioned data records according to the corresponding partition key values;

merging the sorted data records and corresponding partition key values with other data records and other corresponding partition key values, said other data records and other corresponding partition key values being previously received;

mapping each of the partition key values to another key value, said other key value representing a unit of information smaller than the partition key value associated with the merged data records; and generating a dimension table comprising the merged data records and other key values after mapping.

12. The method of claim 1, wherein the data collection and warehousing system comprises a relational database.

13. The method of claim 1, wherein one or more computer readable media have computer-executable instructions for performing the method recited in claim 1.

14. A method of transforming data in a data collection and warehousing system, said method comprising:

receiving a plurality of individual log files from a plurality of servers, said log files each comprising a data record and a partition key value corresponding thereto, wherein the partition key values comprise one or more of the following: a user identifier, a machine identifier, a time interval, a region, and a data source;

sorting the received data records according to the corresponding partition key values;

merging the sorted data records and corresponding partition key values with other data records and other corresponding partition key values, said other data records and other corresponding partition key values being previously received and sorted;

mapping each of the partition key values to another key value, said other key value representing a unit of information smaller than the partition key value associated with the merged data records; and generating a dimension table comprising the merged data records and other key values after mapping.

15. The method of claim 14, further comprising loading the data records from the log files into a relational database in the data collection and warehousing system as a function of the generated dimension table.

16. The method of claim 14, further comprising generating a fact table comprising the merged data records and corresponding partition key values.

17. The method of claim 14, wherein said received data records and corresponding partition key values represent incremental data and wherein said other data records and other corresponding partition key values represent historical data.

18. The method of claim 14, wherein said mapping comprises:

aggregating the merged data records into an aggregated fact table; and assigning a mapped key value to each of the partition key values in the aggregated fact table, each mapped key value representing a unit of information smaller than the partition key value associated with the merged data records in the aggregated fact table.

19. The method of claim 18, wherein generating a dimension table comprises creating a non-relational dimension table corresponding to a relational dimension table in the data collection and warehousing system, said created dimension table containing the merged data records and mapped key values from the aggregated fact table.

20. The method of claim 14, wherein said sorting, merging, mapping, and generating are performed with one or more non-relational database application programs.

21. The method of claim 14, wherein the data collection and warehousing system comprises a relational database.

22. The method of claim 14, wherein one or more computer readable media have computer-executable instructions for performing the method recited in claim 14.

* * * * *

UNITED STATES PATENT AND TRADEMARK OFFICE

CERTIFICATE OF CORRECTION

PATENT NO. : 7,024,431 B1
APPLICATION NO. : 10/429571
DATED : April 4, 2006
INVENTOR(S) : Kornelson et al.

It is certified that error appears in the above-identified patent and that said Letters Patent is hereby corrected as shown below:

On the face page, in field (56), under "U.S. Patent Documents", in column 2, line 2, after "6,418,450" delete "B1" and insert -- B2 --, therefor.

In column 10, line 32, delete "P111" and insert -- P11 --, therefor.

In column 10, line 47–48, delete "Welbum" and insert -- Welburn --, therefor.

In column 10, line 49, delete "Welbum" and insert -- Welburn --, therefor.

In column 10, line 54, delete "Welbum" and insert -- Welburn --, therefor.

In column 10, line 55, delete "Welbum" and insert -- Welburn --, therefor In column 16, line 62, in Claim 1, after "interval" insert -- , --.

Signed and Sealed this

Thirtieth Day of March, 2010

David J. Kappos

*Director of the United States Patent and Trademark Office*